US012563307B2

(12) United States Patent
Dasilva et al.

(10) Patent No.: US 12,563,307 B2
(45) Date of Patent: Feb. 24, 2026

(54) REDUNDANT STORAGE OF IMAGE DATA IN AN IMAGE RECORDING SYSTEM

(71) Applicant: Sphere Entertainment Group, LLC, New York, NY (US)

(72) Inventors: Deanan Dasilva, Malibu, CA (US); Michael Graae, Brooklyn, NY (US)

(73) Assignee: Sphere Entertainment Group, LLC, New York, NY (US)

( * ) Notice: Subject to any disclaimer, the term of this patent is extended or adjusted under 35 U.S.C. 154(b) by 140 days.

(21) Appl. No.: 18/335,655

(22) Filed: Jun. 15, 2023

(65) Prior Publication Data

US 2024/0214690 A1 Jun. 27, 2024

Related U.S. Application Data

(60) Provisional application No. 63/434,310, filed on Dec. 21, 2022.

(51) Int. Cl.
| | |
|---|---|
| *H04N 23/80* | (2023.01) |
| *H04N 1/21* | (2006.01) |
| *H04N 23/661* | (2023.01) |

(52) U.S. Cl.
CPC ........... *H04N 23/80* (2023.01); *H04N 1/2112* (2013.01); *H04N 23/661* (2023.01)

(58) Field of Classification Search
CPC .... H04N 23/80; H04N 1/2112; H04N 23/661; H04N 1/2129
See application file for complete search history.

(56) References Cited

U.S. PATENT DOCUMENTS

| | | | |
|---|---|---|---|
| 2008/0151094 A1* | 6/2008 | Ogawa | ................. H04N 23/631 348/333.02 |
| 2013/0024425 A1* | 1/2013 | Huang | .................... G06F 16/16 707/650 |

(Continued)

FOREIGN PATENT DOCUMENTS

| | | | |
|---|---|---|---|
| CN | 109299060 A | | 2/2019 |
| JP | 2005196358 A | * | 7/2005 |

(Continued)

OTHER PUBLICATIONS

Wikipedia—P2 (storage media), Nov. 28, 2021, Retrieved from https://en.wikipedia.org/w/index.php?title=P2_(storage_media) &oldid=1057529026 on Mar. 5, 2025 (Year: 2021).*

(Continued)

*Primary Examiner* — Timothy J Henn
(74) *Attorney, Agent, or Firm* — Sterne, Kessler, Goldstein & Fox P.L.L.C.

(57) ABSTRACT

Systems, methods, and apparatuses disclosed herein can store a first copy of digital image data that is related to an image, for example, a scene. These systems, methods, and apparatuses can store the first copy of digital image data as unprocessed digital image data in a raw image format that includes color information for each pixel of the image. Often times, not all the available system resources, such as central processing unit (CPU) resources, memory resources, system bandwidth, and/or electrical power to provide some examples, are utilized by these systems, methods, and apparatuses to store the first copy of the digital image data. Some of the excess system resources can be utilized by these systems, methods, and apparatuses to store a second copy of at least some of the digital image data in the raw image format and/or in an image file format.

20 Claims, 5 Drawing Sheets

(56)          References Cited

U.S. PATENT DOCUMENTS

| | | |
|---|---|---|
| 2013/0270880 A1 | 10/2013 | Lee |
| 2014/0133764 A1* | 5/2014 | Hong .................. G06V 40/172 |
| | | 382/224 |
| 2015/0334264 A1 | 11/2015 | Matsuno |
| 2020/0204730 A1 | 6/2020 | Matsumoto et al. |
| 2020/0244875 A1 | 7/2020 | Lee et al. |

FOREIGN PATENT DOCUMENTS

| | | |
|---|---|---|
| KR | 102182098 B1 | 12/2020 |
| WO | 2008050674 A1 | 5/2008 |

OTHER PUBLICATIONS

Wikipedia—Raw image format, Jan. 31, 2020, Retrieved from https://en.wikipedia.org/w/index.php?title=Raw_image_format&oldid= 938454223 on Jul. 12, 2025 (Year: 2020).*

International Search Report and Written Opinion directed to related International Application No. PCT/US2023/081779, mailed Mar. 11, 2024; 12 pages.

International Search Report and Written Opinion directed to related International Application No. PCT/US2025/010886, mailed Apr. 24, 2025; 9 pages.

Hariyama et al., "Highly-Parallel Stereo Vision VLSI Processor Based on an Optimal Parallel Memory Access Scheme," Mar. 1, 2001; 8 pages.

* cited by examiner

400

402

404

REDUNDANT STORAGE OF IMAGE DATA IN AN IMAGE RECORDING SYSTEM

CROSS-REFERENCE TO RELATED APPLICATIONS

The present application claims the benefit of U.S. Provisional Patent Application No. 63/434,310, filed Dec. 21, 2022, which is incorporated herein by reference in its entirety.

BACKGROUND

Most modern digital cameras acquire images using a single image sensor overlaid with a color mask, such as a Bayer filter mosaic to provide an example, that absorbs undesired color wavelengths so that each pixel of the single image sensor is sensitive to a specific color wavelength. The color mask is a mosaic of tiny color filters placed over the pixel sensors of the single image sensor to capture color information, such as red, green, and/or blue color components of a red, green, blue (RGB) color model to provide some examples. Often times, the modern digital cameras read the digital image data in row-wise, namely, row-by-row, from the single image sensor in a raw image format. However, displays of these modern digital cameras cannot display the digital image data in the raw image format. As such, the modern digital cameras reconstruct and save a full-color image from the digital image data in the raw image format. However, this reconstruction necessarily results in the loss of information stored in the raw image format. For example, the image quality of the JPEG file format is less than the image quality of the raw image format as the JPEG file format only accommodates 256 shades of color as compared to between 4,096 and 65,535 shades of color of the raw image format.

BRIEF DESCRIPTION OF THE DRAWINGS

The present disclosure is described with reference to the accompanying drawings. In the drawings, like reference numbers indicate identical or functionally similar elements. Additionally, the left most digit(s) of a reference number identifies the drawing in which the reference number first appears. In the accompanying drawings.

Figure 1:
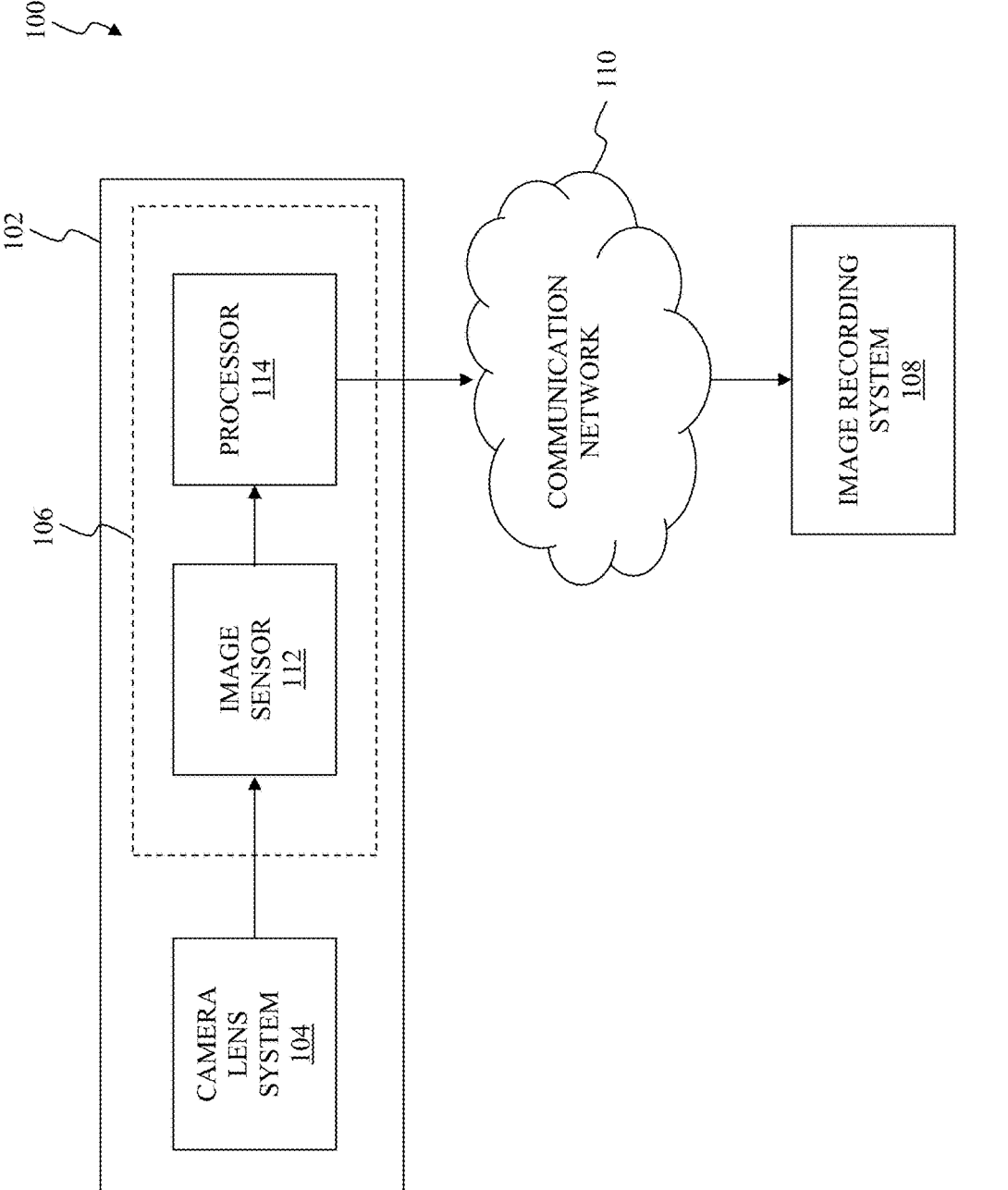
FIG. 1 illustrates a simplified block diagram of an exemplary image capture system according to some exemplary embodiments of the present disclosure.

The present disclosure will now be described with reference to the accompanying drawings.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. Aspects of the present disclosure are best understood from the following detailed description when read with the accompanying figures. The present disclosure may repeat reference numerals and/or letters in the various examples. This repetition does not in itself dictate a relationship between the various embodiments and/or configurations discussed. It is noted that, in accordance with the standard practice in the industry, features are not drawn to scale. In fact, the dimensions of the features may be arbitrarily increased or reduced for clarity of discussion.

Overview

Systems, methods, and apparatuses disclosed herein can store a first copy of digital image data that is related to an image, for example, a scene. These systems, methods, and apparatuses can store the first copy of digital image data as unprocessed digital image data in a raw image format that includes color information for each pixel of the image. Often times, not all the available system resources, such as central processing unit (CPU) resources, memory resources, system bandwidth, and/or electrical power to provide some examples, are utilized by these systems, methods, and apparatuses to store the first copy of the digital image data. In some embodiments, some of the excess system resources can be utilized by these systems, methods, and apparatuses to store a second copy of at least some of the digital image data in the raw image format and/or in an image file format.

Exemplary Image Capture System for Capturing Images

FIG. 1 illustrates a simplified block diagram of an exemplary image capture system according to some exemplary embodiments of the present disclosure. As to be described in further detail below, an image capture system 100 can store a first copy of digital image data that is related to an image, for example, a scene, that is captured by the image capture system 100. In some embodiments, the image capture system 100 can store the first copy of digital image data as unprocessed digital image data in a raw image format that includes color information, for example, luminance and/or chrominance color components of YUV color model and/or red, green, and/or blue color components of a red, green, blue (RGB) color model to provide some examples, for each pixel of the image. As to be described in further detail below, not all the available system resources of the image capture system 100, such as central processing unit (CPU) resources, memory resources, system bandwidth, and/or electrical power to provide some examples, are utilized by the image capture system 100 to store the first copy of the digital image data. In some embodiments, some of the excess system resources can be utilized by the image capture system 100 to store a second copy of at least some of the digital image data in the raw image format and/or in an image file format as to be described in further detail below. As illustrated in FIG. 1, the image capture system 100 can include a camera system 102, having a camera lens system 104 and a camera housing 106, which can be communicatively coupled to an image recording system 108 via a communication network 110. Although the image capture system 100 is illustrated in FIG.

1 as including multiple, discrete devices, those skilled in the relevant art(s) will recognize that one of more of these devices can be combined without departing from the spirit and scope of the present disclosure. For example, the camera system 102 can include the camera lens system 104, the camera housing 106, and/or the image recording system 108 as a single discrete device without the communication network 110 as will be apparent to those skilled in the relevant art(s) without departing from the spirit and scope of the present disclosure.

In the exemplary embodiment illustrated in FIG. 1, the camera lens system 104 projects light that is related to the image, for example, the scene, within its field of view onto an image sensor 112 of the camera housing 106 that is to be described in further detail below. In some embodiments, the camera lens system 104 can focus, for example, converge, the light that is captured onto the image sensor 112. For example, the camera lens system 104 can focus the light that is reflected from one or more physical objects within, for example, the scene, onto the image sensor 112. In some embodiments, the camera lens system 104 can include a simple single lens; however, more complicated compound lenses, such as doublet lenses, triplet lenses, and/or achromatic lenses, are possible as will be apparent to those skilled in the relevant art(s) without departing from the spirit and scope of the present disclosure. In these embodiments, the single lens and/or the compound lenses can be implemented using glass, crystal, and/or plastic, such as acrylic to provide an example. In some embodiments, the compound lenses can be configured and arranged to form an ultra-wide-angle lens, such as a fisheye lens that produces strong visual distortion intended to create a hemispherical image and/or a rectilinear lens with little or no barrel or pincushion distortion that yields images where straight features, such as the edges of walls of buildings, appear with straight lines, as opposed to being curved as with the fisheye lens to provide some examples.

The camera housing 106 captures the light that is focused by the camera lens system 104 onto the image sensor 112 to provide digital image data that is associated with the image. In the exemplary embodiment illustrated in FIG. 1, the camera housing 106 can include the image sensor 112 and a processor 114. Generally, the image sensor 112 converts the light, namely, the photons, which is focused onto the image sensor 112 by the camera lens system 104 into electrical signals. In some embodiments, the image sensor 112 can convert the electrical signals from a representation in the analog signal domain to a representation in the digital signal domain to provide the digital image data to be stored by the image recording system 108 as to be described in further detail below. In some embodiments, the image sensor 112 can include small picture elements, also referred to as pixels, which can include light sensitive elements, micro lenses, and/or micro electrical components. In some embodiments, the pixels can be configured and arranged as a series of rows and a series of columns to form an array of pixels, for example, a square array of pixels. In these embodiments, the image sensor 112 can include 18,000 rows of pixels and 18,000 columns of pixels to form an 18,000 by 18,000 square array of pixels. In some embodiments, the image sensor 112 can be implemented as a charge-coupled device (CCD) or an active-pixel sensor that can be fabricated in complementary metal-oxide-silicon (CMOS) and/or n-type metal-oxide-silicon (NMOS) technologies. In some embodiments, the image sensor 112 can be implemented as a color sensor that includes a color mask, such as a Bayer filter mosaic to provide an example, that absorbs undesired color wavelengths so that each pixel of the image sensor 112 is sensitive to a specific color wavelength and/or a monochromatic sensor without the color mask so that each pixel of the image sensor 112 is sensitive to all visible light wavelengths. In these embodiments, the digital image data can include color information, for example, luminance and/or chrominance color components of YUV color model and/or red, green, and/or blue color components of a RGB color model to provide some examples, of each pixel of the image sensor 112.

The processor 114 can provide the digital image data that is developed by the image sensor 112 to the image recording system 108. In some embodiments, the processor 114 can read the digital image data in a raw image format row-wise, namely, row-by-row, and/or column-wise, namely, column-by-column, from the image sensor 112. In these embodiments, the processor 114 can simultaneously read multiple rows and/or multiple columns of the digital image data in the raw image format. In some embodiments, the processor 114 can insert row and/or column markers into the digital image data in the raw image format. In these embodiments, the row and/or column markers can be used to correlate the digital image data in the raw image format to the image that is projected onto the image sensor 112. In some embodiments, the processor 114 can provide the digital image data to the image recording system 108 in the raw image format. In these embodiments, the raw image format includes the color information of the image as read from the image sensor 112. Because there are many different designers and manufacturers of camera systems and/or image sensors, there are many different types of raw image formats. Some of the more common raw image formats include Digital Negative Image (.DNI), Canon Raw 2 Image File (.CR2), Nikon Electronic Format RAW Image (.NEF), and Sony Alpha Raw Digital Camera Image (.ARW) to provide some examples. In some embodiments, the raw image format can be used by the camera system 102 to provide high image quality images that can accommodate vast shades of color depth, for example, between 4,096 and 65,535 shades of color, and a wide dynamic range from shadows to highlights. In some embodiments, the processor 114 can format the digital image data for transmission to the image recording system 108 over the communication network 110.

In some embodiments, the processor 114 can reconstruct the image in an image file format from the digital image data and thereafter provide the image to the image recording system 108. In these embodiments, the image file format can include Joint Photographic Experts Group (JPEG) image file format, Exchangeable Image File Format (EXIF), Tagged Image File Format (TIFF), Graphics Interchange Format (GIF), bitmap image file (BMP) format, or Portable Network Graphics (PNG) image file format to provide some examples. In these embodiments, the processor 114 can implement one or more digital image processing techniques, also referred to as digital picture processing techniques, to process the digital image data that are developed by the image sensor 112 to reconstruct the image from the digital image data. In some embodiments, the one or more digital image processing techniques can include decoding, demosaicing, defective pixel removal, white balancing, noise reduction, color translation, tone reproduction, compression, removal of systematic noise, dark frame subtraction, optical correction, contrast manipulation, unsharp masking, and/or any other suitable well known digital image processing technique that will be apparent to those skilled in the relevant art(s) without departing from the spirit and scope of the present disclosure. In some embodiments, the processor 114 can format the digital image data and/or the image for transmission to the image recording system 108 over the communication network 110. In some embodiments, the processor 114 can compress the digital image data and/or the image using, for example, lossless compression techniques, such as Lempel-Ziv based lossless compression techniques, and/or lossy compression techniques, such as discrete cosine transform (DCT) based lossy compression techniques. In some embodiments, the processor 114 can include, or be coupled to, an electrical-to-optical converter to transform the digital image data from electrical signals to optical signals for transmission over a fiber optic network.

The image recording system 108 can receive the digital image data in the raw image format and/or the image reconstructed from the digital image data in the image file format provided by the camera system 102. In some embodiments, the image recording system 108 can include, or be coupled to, an electrical-to-optical converter to transform the digital image data from optical signals to electrical signals. In some embodiments, the image recording system 108 can store the first copy of the digital image data as unprocessed digital image data in the raw image format. In these embodiments, the image recording system 108 can include one or more machine-readable mediums that can include one or more mechanisms for storing, namely, writing, the digital image data in a form that is readable by one or more electrical, mechanical, and/or electromechanical devices. In these embodiments, the one or more machine-readable mediums can include, but is not limited to, read only memory (ROM); random access memory (RAM); magnetic disk storage media; optical storage media; flash memory devices; and/or others to provide some examples. Alternately, or in addition to, the one or more machine-readable mediums can include a hard disk drive, for example, a solid-state drive, a floppy disk drive along with associated removable media, a CD-ROM drive, an optical drive, a flash memory, and/or a removable media cartridge. In some embodiments, the image recording system 108 can stripe the first copy of the digital image data across multiple machine-readable mediums. In these embodiments, the image recording system 108 can interleave image data slices of the first copy of the digital image data across the multiple machine-readable mediums in a round-robin fashion. Typically, the round-robin fashion sequentially cycles through the multiple machine-readable mediums one after another; however, those skilled in the relevant art(s) will recognize that the round-robin manner may cycle through the multiple machine-readable mediums in any suitable order without departing from the spirit and scope of the present disclosure. In these embodiments, the image data slices of the first copy of the digital image data can be associated with different sections of the image, for example, upper sections of the image, middle sections of the image, and/or lower sections of the image, and/or different components of the color information, for example, red, green, and/or blue color components of the RGB color model, for the different sections of the image. In some embodiments, the different sections of the image can be associated with different sections of a media plane of a venue, such as a music venue, for example, a music theater, a music club, and/or a concert hall, a sporting venue, for example, an arena, a convention center, and/or a stadium, and/or any other suitable venue that will be apparent to those skilled in the relevant art(s) without departing from the spirit and scope of the present disclosure.

In the exemplary embodiment illustrated in FIG. 1, the image recording system 108 can estimate system resources of the image capture system 100, such as central processing unit (CPU) resources, memory resources, system bandwidth, and/or electrical power to provide some examples, that are utilized by the image recording system 108 to store the first copy of the digital image data. In some embodiments, not all of the system resources are utilized by the image recording system 108 to store the first copy of the digital image data. In these embodiments, the image recording system 108 can estimate excess system resources, such as excess CPU resources, excess memory resources, excess system bandwidth, and/or excess electrical power to provide some examples, which are not being used by the image recording system 108 to store the first copy of the digital image data. As to be described in further detail below, the image recording system 108 can store a second copy of at least some of the digital image data in the raw image format and/or as processed digital image data in the image file format to utilize the excess system resources. In some embodiments, the image recording system 108 can reconstruct the image in the image file format from the digital image data. In these embodiments, the image recording system 108 can implement one or more digital image processing techniques, also referred to as digital picture processing techniques, to process the digital image data that are developed by the image sensor 112 to reconstruct the image from the digital image data. In some embodiments, the one or more digital image processing techniques can include decoding, demosaicing, defective pixel removal, white balancing, noise reduction, color translation, tone reproduction, compression, removal of systematic noise, dark frame subtraction, optical correction, contrast manipulation, unsharp masking, and/or any other suitable well known digital image processing technique that will be apparent to those skilled in the relevant art(s) without departing from the spirit and scope of the present disclosure.

After estimating the excess system resources, the image recording system 108 can store the second copy of at least some of the digital image data utilizing the excess system resources. In some embodiments, the image recording system 108 can stripe the second copy of at least some of the digital image data across the multiple machine-readable mediums. In these embodiments, the image recording system 108 can interleave image data slices of the second copy of at least some of the digital image data across the multiple machine-readable mediums in the round-robin fashion. In these embodiments, the image data slices of the second copy of at least some of the digital image data can be associated with different sections of the image, for example, upper sections of the image, middle sections of the image, and/or lower sections of the image, and/or different components of the color information, for example, red, green, and/or blue color components of the RGB color model, for the different sections of the image.

In some embodiments, the image recording system 108 can evaluate the digital image data and/or the image that can be reconstructed from the digital image data to intelligently decide the most important digital image data to be stored as the second copy of at least some of the digital image data using the excess system resources. In some embodiments, the image recording system 108 can intelligently decide the most important digital image data based upon, for example, relative distribution of foreground objects in the image, information related to which region of the image will be viewed by an audience, and/or sections of the image having more complexity, movement or detail as compared to other sections of the image. In some embodiments, the image recording system 108 can analyze the digital image data and/or the image that can be reconstructed from the digital image data to estimate the energy in different areas of the digital image data and/or the image that can be reconstructed from the digital image data. In these embodiments, the image recording system 108 can effectively evaluate different areas of the digital image data and/or the image as higher energy areas through lower energy areas. In these embodiments, these higher energy areas through lower energy areas can be determined based upon compression efficiency. In these embodiments, the image recording system 108 can intelligently decide these higher energy areas as being the most important digital image data. Alternatively, or in addition to, the image recording system 108 can access a listing of objects of interest that describes various that have predetermined to be the most important digital image data. In some embodiments, the image recording system 108 can implement an object detection, for example, any suitable well-known neural network-based or non-neural approach that will be apparent to those skilled in the relevant art(s) without departing from the spirit and scope of the present disclosure, to scan the digital image data and/or the image that can be reconstructed from the digital image data for the objects of interest from among the listing of objects of interest. Alternatively, or in addition to, the image recording system 108 can evaluate the excess system resources to intelligently decide the most important digital image data to be stored as the second copy of at least some of the digital image data using the excess system resources. In these embodiments, the excess system resources can include the excess memory resources, such as storage space, in the image recording system 108 after the first copy of the digital image data is stored in the raw image format and/or the excess bandwidth available in the image recording system 108 to store the second copy of at least some of the digital image data.

In some embodiments, the image recording system 108 can compress at least some of the digital image data to enhance the utilization of the excess system resources. In these embodiments, the image recording system 108 can compress at least some of the first copy of the digital image data such that the image recording system 108 utilizes less system resources, such as CPU resources, memory resources, system bandwidth, and/or electrical power to provide some examples, to store the first copy of the digital image data. In some embodiments, the image recording system 108 can compress at least some of the second copy of at least some of the digital image data such that the image recording system 108 utilizes less system resources, such as CPU resources, memory resources, system bandwidth, and/or electrical power to provide some examples, to store the second copy of at least some of the digital image data. In these embodiments, the compression of the first copy of the digital image data and/or the second copy of at least some of the digital image data allows the image recording system 108 to store more digital image data. In these embodiments, the image recording system 108 can compress some of the digital image data in the raw image format and/or the image file format using, for example, lossless compression techniques, such as Lempel-Ziv based lossless compression techniques, and/or lossy compression techniques, such as discrete cosine transform (DCT) based lossy compression techniques.

The communication network 110 communicatively couples the camera system 102 and the image recording system 108. The communication network 110 can implemented as a wireless communication network, a wireline communication network, and/or any combination thereof that will be apparent to those skilled in the relevant art(s)

without departing from the spirit and scope of the present disclosure. In some embodiments, the communication network 110 can include a fiber optic network or a coaxial network that uses optical fiber or coaxial cable to deliver the image from the camera housing 106 to the image recording system 108. In some embodiments, the communication network 110 can include a hybrid fiber coaxial (HFC) network that combines optical fiber and coaxial cable to deliver the image from the camera housing 106 to the image recording system 108.

Figure 2:
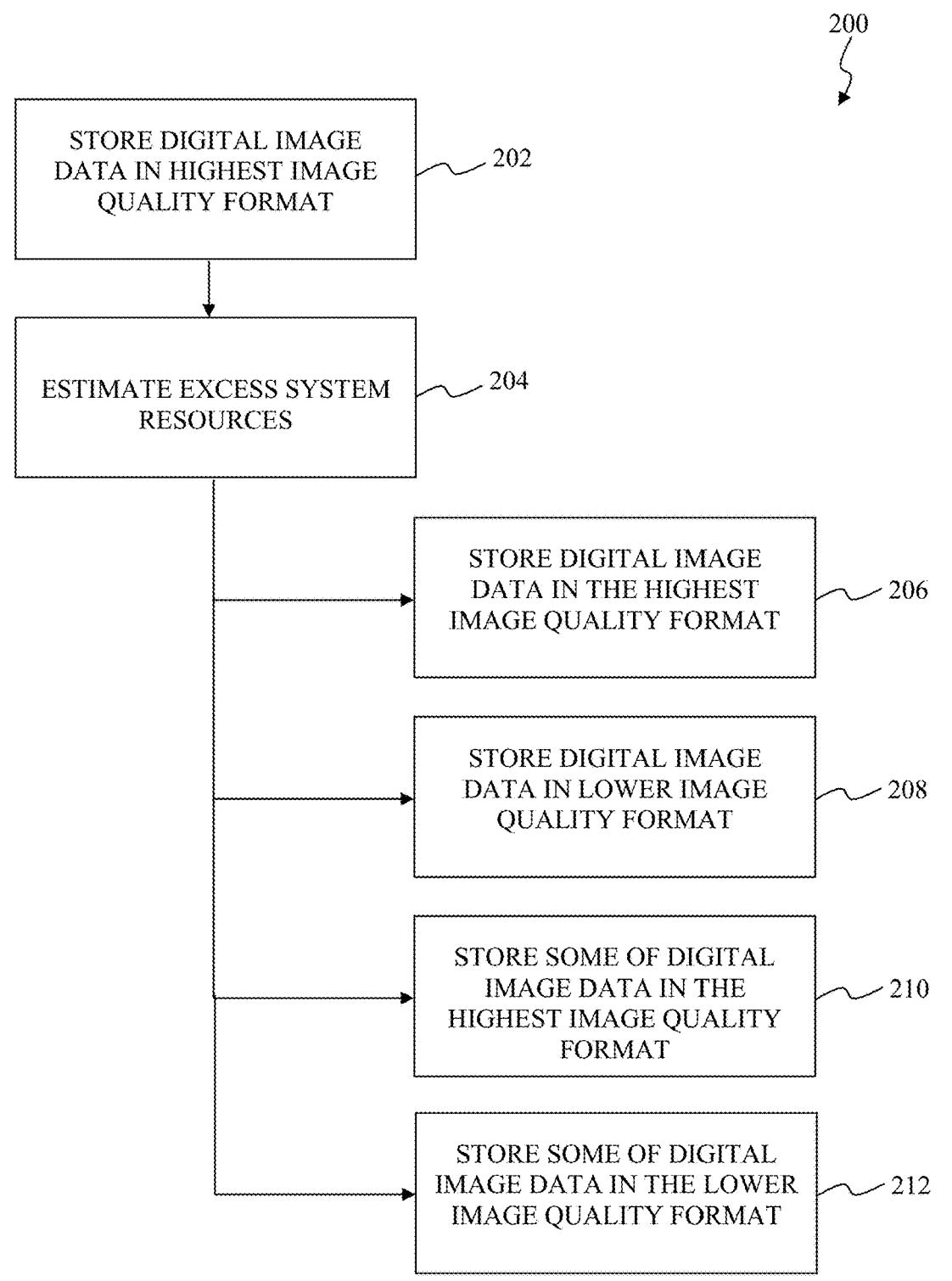
FIG. 2 illustrates a flowchart of an exemplary operation of an exemplary image recording system that can be implemented within the exemplary image capture system according to some exemplary embodiments of the present disclosure.

Exemplary Image Recording System that can be Implemented Within the Exemplary Image Capture System FIG. 2 illustrates a flowchart of an exemplary operation of an exemplary image recording system that can be implemented within the exemplary image capture system according to some exemplary embodiments of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 200 for storing digital image data, such as the digital image data as described above in FIG. 1. The operational control flow 200 can be executed by one or more computer systems, such as the image recording system 108 as described above in FIG. 1 to provide an example.

At operation 202, the operational control flow 200 stores a first copy of the digital image data in a highest image quality format, such as the raw image format as described above in FIG. 1. In some embodiments, the highest image quality format can be characterized as having higher sharpness, lower noise, higher dynamic range, higher tone reproduction, higher contrast, higher color accuracy, higher distortion, and/or higher artifacts when compared to the lower image quality format as to be described in further detail below. In some embodiments, the operational control flow 200 can stripe the first copy of the digital image data across multiple machine-readable mediums. In these embodiments, the operational control flow 200 can interleave image data slices of the first copy of the digital image data across the multiple machine-readable mediums in the round-robin fashion. In these embodiments, the image data slices of the first copy of the digital image data can include the components of the color information, for example, red, green, and/or blue color components of the RGB color model, for different sections of the image that can be reconstructed from the digital image data.

At operation 204, the operational control flow 200 can estimate excess system resources, such as excess CPU resources, excess memory resources, excess system bandwidth, and/or excess electrical power to provide some examples, which are not being used by the operational control flow 200 to store the first copy of the digital image data in the highest image quality format from operation 202. And as described above, not all the available system resources of the one or more computer systems, such as central processing unit (CPU) resources, memory resources, system bandwidth, and/or electrical power to provide some examples, are utilized by the operational control flow 200 to store the first copy of the digital image data. As such, the operational control flow 200 can store a second copy of at least some of the digital image data from operation 204 in the highest image quality format from operation 202 and/or in the lower image quality format as to be described in further detail below in operation 208 utilizing the excess system resources.

At operation 206, the excess system resources from operation 204 are sufficient to store a second copy of the digital image data from operation 202 in the highest image quality format from operation 202. As such, the operational control flow 200 can utilize the excess system resources from operation 204 to store the second copy of the digital image data from operation 202 in the highest image quality format from operation 202.

At operation 208, the excess system resources from operation 204 are sufficient to store a second copy of the digital image data from operation 202 in the lower image quality format. As such, the operational control flow 200 can utilize the excess system resources from operation 204 to store the second copy of the digital image data from operation 202 in the lower image quality format, such as the image file format as described above in FIG. 1, that has a lower image quality when compared the highest image quality format from operation 202 when the excess system resources from operation 204 are sufficient. In some embodiments, the lower image quality format can be characterized as having lower sharpness, higher noise, lower dynamic range, lower tone reproduction, lower contrast, lower color accuracy, lower distortion, and/or lower artifacts when compared to the highest image quality format from operation 202.

At operation 210, the excess system resources from operation 204 are sufficient to store a second copy of at least some of the digital image data from operation 202 in the highest image quality format from operation 202. As such, the operational control flow 200 can utilize the excess system resources from operation 204 to store the second copy of at least some of the digital image data from operation 202 in the highest image quality format from operation 202. In some embodiments, the operational control flow 200 can evaluate the digital image data from operation 202 to intelligently decide the most important digital image data to be stored utilizing the excess system resources from operation 204 in a substantially similar manner as described above in FIG. 1.

At operation 212, the excess system resources from operation 204 are sufficient to store a second copy of at least some of the digital image data from operation 202 in the lower image quality format from operation 208. As such, the operational control flow 200 can utilize the excess system resources from operation 204 to store the second copy of at least some of the digital image data from operation 202 in the lower image quality format from operation 208. In some embodiments, the operational control flow 200 can evaluate the digital image data from operation 202 to intelligently decide the most important digital image data to be stored utilizing the excess system resources from operation 204 in a substantially similar manner as described above in FIG. 1.

Figure 3:
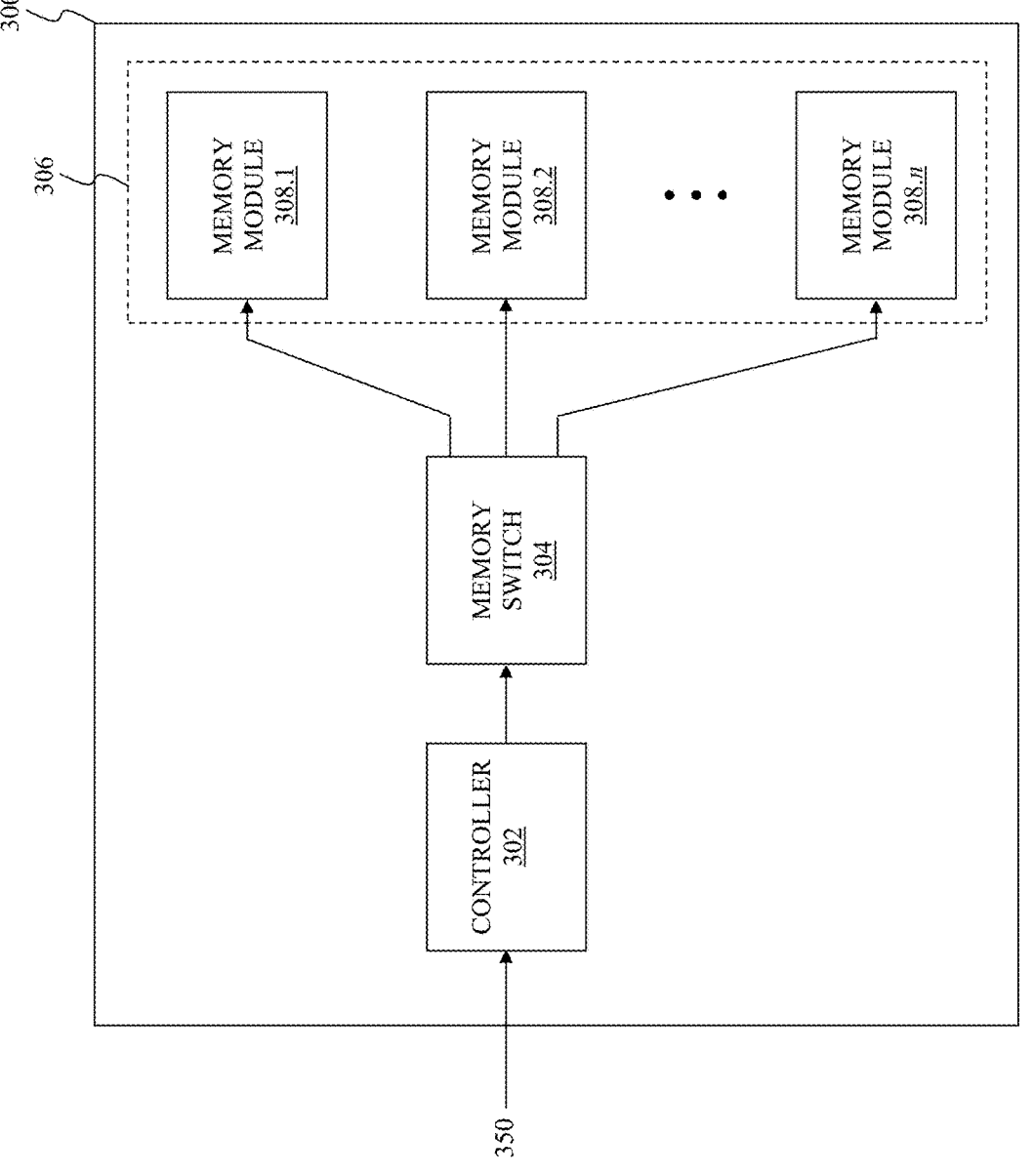
FIG. 3 illustrates a simplified block diagram of the exemplary image recording system that can be implemented within the exemplary image capture system according to some exemplary embodiments of the present disclosure.

FIG. 3 illustrates a simplified block diagram of the exemplary image recording system that can be implemented within the exemplary image capture system according to some exemplary embodiments of the present disclosure. As to be described in further detail below, an image recording system 300 can receive digital image data that is related to an image, for example, a scene, from a camera system, such as the camera system 102 as described above in FIG. 1. As to be described in further detail below, the image recording system 300 can store the digital image data. In some embodiments, the image recording system 300 can store a first copy of the digital image data as unprocessed digital image data in a raw image format that includes color information, for example, luminance and/or chrominance color components of YUV color model and/or red, green, and/or blue color components of a RGB color model to provide some examples, of image. As to be described in further detail below, not all the available system resources of the image recording system 300, such as central processing unit (CPU) resources, memory resources, system bandwidth, and/or electrical power to provide some examples, are utilized by the image recording system 300 to store the first copy of the digital image data. In some embodiments, some of the excess system resources can be utilized by the image recording system 300 to store a second copy of at least some of the digital image data in the raw image format and/or in an image file format as to be described in further detail below. As illustrated in FIG. 3, the image recording system 300 can include a controller 302, a memory switch 304, and a memory storage 306. The image recording system 300 can represent an exemplary embodiment of the image recording system 108 as described above in FIG. 1.

The controller 302 controls the overall configuration and/or operation of the image recording system 300 in storing the digital image data. In the exemplary embodiment illustrated in FIG. 3, the controller 302 receives the digital image data from, for example, a camera system, such as the camera system 102 as described above in FIG. 1, in the raw image format. In some embodiments, the controller 302 can include, or be coupled to, an electrical-to-optical converter to transform the digital image data from optical signals to electrical signals. After receiving the digital image data, the controller 302 provides the first copy of the digital image data in the raw format to the memory switch 304 to be routed to the memory storage 306 for storage. In some embodiments, the controller 302 can cause the memory switch 304 to stripe the first copy of the digital image data across memory modules 308.1 through 308.n of the memory storage 306, which are to be described in further detail below. In these embodiments, the controller 302 can cause the memory switch 304 to interleave image data slices of the first copy of the digital image data across the memory modules 308.1 through 308.n in the round-robin fashion. In some embodiments, the controller 302 can segment the first copy of the digital image data into the image data slices of the first copy of the digital image data that are to be interleaved across the memory modules 308.1 through 308.n. In these embodiments, the image data slices of the first copy of the digital image data can be associated with different sections of the image, for example, upper sections of the image, middle sections of the image, and/or lower sections of the image, and/or different components of the color information, for example, red, green, and/or blue color components of the RGB color model, for the different sections of the image. For example, the controller 302 can segment the first copy of the digital image data into a first image data slice that is associated with a red color component of the upper section of the image, a second image data slice that is associated with a green color component of the upper section of the image, a third image data slice that is associated with a blue color component of the upper section of the image, etc. In some embodiments, the controller 302 can utilize the row and/or column markers, as described above, within the digital image data to identify the image data slices of the first copy of the digital image data.

After segmenting the digital image data, the controller 302 can identify corresponding memory modules from among the memory modules 308.1 through 308.n that correspond to the sections of the image and/or the components of the color information that are associated with the image data slices of the first copy of the digital image data. In some embodiments, the controller 302 can store a memory module routing map that assigns the memory modules 308.1 through 308.*n* to different sections of the image, for example, upper sections of the image, middle sections of the image, and/or lower sections of the image, and/or different components of the color information, for example, red, green, and/or blue color components of the RGB color model, for the different sections of the image. In these embodiments, the controller 302 can utilize the memory module routing map to route the image data slices of the first copy of the digital image data to corresponding memory modules from among the memory modules 308.1 through 308.*n* that corresponds to the sections and/or the components of the color information of the image data slices of the first copy of the digital image data. Thereafter, the controller 302 can cause the memory switch 304 to store the image data slices of the first copy of the digital image data into the corresponding memory modules. From the example above, the controller 302 can cause the memory switch 304 to store the first image data slice that is associated with the red color component of the upper section of the image in a first memory module from among the memory modules 308.1 through 308.*n*, the second image data slice that is associated with the green color component of the upper section of the image in a second memory module from among the memory modules 308.1 through 308.*n*, the third image data slice that is associated with the blue color component of the upper section of the image in a third memory module from among the memory modules 308.1 through 308.*n*, etc.

In some embodiments, the controller 302 can estimate excess system resources, such as excess CPU resources, excess memory resources, excess system bandwidth, and/or excess electrical power to provide some examples, which are not being used by the image recording system 300 to store the first copy of the digital image data. In the exemplary embodiment illustrated in FIG. 3, the controller 302 can estimate a system bandwidth at which the controller 302 is providing the first copy of the digital image data to the memory switch 304. Thereafter, the controller 302 can compare this estimated system bandwidth with a theoretical maximum system bandwidth at which the controller 302 can provide the first copy of the digital image data to the memory switch 304 to estimate an excess system bandwidth. After estimating the excess system resources, the controller 302 can provide a second copy of at least some of the digital image data in the raw image format and/or in the image file format to the memory switch 304 to be routed to the memory storage 306 for storage to utilize the excess system resources. In some embodiments, the controller 302 can implement one or more digital image processing techniques, also referred to as digital picture processing techniques, to process the digital image data to reconstruct the image from the digital image data. In some embodiments, the one or more digital image processing techniques can include decoding, demosaicing, defective pixel removal, white balancing, noise reduction, color translation, tone reproduction, compression, removal of systematic noise, dark frame subtraction, optical correction, contrast manipulation, unsharp masking, and/or any other suitable well known digital image processing technique that will be apparent to those skilled in the relevant art(s) without departing from the spirit and scope of the present disclosure. In some embodiments, the controller 302 can provide the second copy of at least some of the digital image data to the memory switch 304 at the excess system bandwidth to be routed to the memory storage 306 for storage to utilize the excess system bandwidth.

After estimating the excess system resources, the controller 302 can cause the memory switch 304 to store a second copy of at least some of the digital image data in the raw image format and/or in the image file format to utilize the excess system resources. In some embodiments, the controller 302 can cause the memory switch 304 to stripe the second copy of at least some of the digital image data across memory modules 308.1 through 308.*n* of the memory storage 306, which are to be described in further detail below. In these embodiments, the controller 302 can cause the memory switch 304 to interleave image data slices of the second copy of at least some of the digital image data across the memory modules 308.1 through 308.*n* in the round-robin fashion. In some embodiments, the controller 302 can segment the second copy of at least some of the digital image data into the image data slices of the second copy of at least some of the digital image data that are to be interleaved across the memory modules 308.1 through 308.*n*. In these embodiments, the image data slices of the second copy of at least some of the digital image data can be associated with different sections of the image, for example, upper sections of the image, middle sections of the image, and/or lower sections of the image, and/or different components of the color information, for example, red, green, and/or blue color components of the RGB color model, for the different sections of the image.

In some embodiments, the controller 302 can estimate required system resources needed to store the second copy of at least some of the digital image data. In these embodiments, the controller 302 can cause the memory switch 304 to store the second copy of at least some of the digital image data when the required system resources are less than or equal to the excess system resources. In some embodiments, the controller 302 can determine whether the excess system resources are sufficient to store a second copy of the digital image data in the raw image format. In these embodiments, the controller 302 can cause the memory switch 304 to store the second copy of the digital image data in the raw image format when the excess system resources are sufficient. Otherwise, the controller 302 can adjust, for example, the image quality of the digital image data from the raw image format to the image file format when the excess system resources are insufficient to store the second copy of the digital image data in the raw image format. Generally, the image recording system 300 utilizes fewer system resources to store the second copy of the digital image data in the image file format as compared to the raw image format. For example, the digital image data in the raw image format usually occupies between two and six times more storage space than the digital image data in a JPEG file format. However, the image quality of the JPEG file format is less than the image quality of the raw image format as the JPEG file format only accommodates 256 shades of color as compared to between 4,096 and 65,535 shades of color of the raw image format. In some embodiments, the controller 302 can determine whether the excess system resources are sufficient to store a second copy of the digital image data in the image file format. In these embodiments, the controller 302 can cause the memory switch 304 to store the second copy of the digital image data in the image file format when the excess system resources are sufficient. Otherwise, the controller 302 can adjust, for example, the quantity of the digital image data to be stored by the memory storage 306 when the excess system resources are insufficient to store the second copy of the digital image data in the raw image format and/or in the image file format. In some embodiments, the controller 302 can determine whether the excess system resources are sufficient to store a second copy of at least some the digital image data in the raw image format and/or in the image file format. In these embodiments, the controller 302 can cause the memory switch 304 to store the second copy of at least some of the digital image data in the raw image format and/or in the image file format when the excess system resources are sufficient.

In some embodiments, the controller 302 can evaluate the digital image data to intelligently decide the most important digital image data to be stored as the second copy of at least some of the digital image data using the excess system resources. In these embodiments, the most important digital image data can be determined from the image that can be reconstructed from the digital image data. In some embodiments, the controller 302 can evaluate the digital image data and/or the image that can be reconstructed from the digital image data to intelligently decide the most important digital image data to be stored using the excess system resources. For example, the image can be projected onto a media plane of a venue during an event. The venue can represent a music venue, for example, a music theater, a music club, and/or a concert hall, a sporting venue, for example, an arena, a convention center, and/or a stadium, and/or any other suitable venue that will be apparent to those skilled in the relevant art(s) without departing from the spirit and scope of the present disclosure. And the event can include a musical event, a theatrical event, a sporting event, a motion picture, and/or any other suitable event that will be apparent to those skilled in the relevant art(s) without departing from the spirit and scope of the present disclosure. In some embodiments, the controller 302 can decide that one or more sections of the image that are projected onto one or more sections of the media plane within the field of view of an audience experiencing the event are the most important digital image data. In some embodiments, the controller 302 can consider one or more sections of the image that include more complexity, movement, and/or detail as compared to other sections of the image as being the most important digital image data.

In some embodiments, the controller 302 can compress some of the digital image data to enhance the utilization of the excess system resources. In some embodiments, the controller 302 can compress at least some of the unprocessed digital image data in the raw image format and/or the processed digital image data in the image file format. In these embodiments, the controller 302 can compress the unprocessed digital image data in the raw image format and/or the processed digital image data in the image file format using, for example, lossless compression techniques, such as Lempel-Ziv based lossless compression techniques, and/or lossy compression techniques, such as discrete cosine transform (DCT) based lossy compression techniques.

The memory switch 304 receives the first copy of the digital image data and/or the second copy of at least some of the digital image data. After receiving the first copy of the digital image data and/or the second copy of at least some of the digital image data, the memory switch 304 routes the first copy of the digital image data and/or the second copy of at least some of the digital image data to the memory storage 306 for storage. In some embodiments, the memory switch 304 can stripe the first copy of the digital image data and/or the second copy of at least some of the digital image data across memory modules 308.1 through 308.n of the memory storage 306 that are to be described in further detail below. In these embodiments, the memory switch 304 can stripe the first copy of the digital image data and/or the second copy of at least some of the digital image data across memory modules 308.1 through 308.n in parallel. In some embodiments, the memory switch 304 can interleave image data slices of the first copy of the digital image data and/or the second copy of at least some of the digital image data across the memory modules 308.1 through 308.n in the round-robin fashion.

The memory storage 306 stores the first copy of the digital image data and/or the second copy of at least some of the digital image data. As illustrated in FIG. 3, the memory storage includes the memory modules 308.1 through 308.n. In the exemplary embodiment illustrated in FIG. 3, the memory modules 308.1 through 308.n can include one or more hard disk drives, for example, one or more solid-state drives, one or more optical drives, one or more flash memories, and/or one or more removable media cartridges to provide some examples to store the first copy of the digital image data and/or the second copy of at least some of the digital image data. In some embodiments, the memory modules 308.1 through 308.n can be assigned to different sections of the image, for example, upper sections of the image, middle sections of the image, and/or lower sections of the image, and/or different components of the color information, for example, red, green, and/or blue color components of the RGB color model, for the different sections of the image. In an exemplary embodiment, the memory modules 308.1 through 308.n includes twelve (12) memory modules 308.1 through 308.12. In this exemplary embodiment, the twelve (12) memory modules 308.1 through 308.12 can be associated with the color components of a Bayer filter mosaic as follows:

TABLE 1

EXEMPLARY MAPPING OF MEMORY MODULES

| MEMORY MODULE | IMAGE SECTION | COLOR COMPONENT |
|---|---|---|
| 308.1 | UPPER | GREEN |
| 308.2 | MIDDLE | GREEN |
| 308.3 | LOWER | RED |
| 308.4 | UPPER | BLUE |
| 308.5 | MIDDLE | GREEN |
| 308.6 | LOWER | GREEN |
| 308.7 | UPPER | RED |
| 308.8 | MIDDLE | BLUE |
| 308.9 | LOWER | GREEN |
| 308.10 | UPPER | GREEN |
| 308.11 | MIDDLE | RED |
| 308.12 | LOWER | BLUE |

It should be noted that the exemplary mapping of the memory modules 308.1 through 308.n in Table 1 above is for illustrative purposes only and not limiting. Those skilled in the relevant art(s) will recognize that other mappings are possible for the memory modules 308.1 through 308.n without departing from the spirit and scope of the present disclosure.

Exemplary Venue of the Present Disclosure

Figure 4:
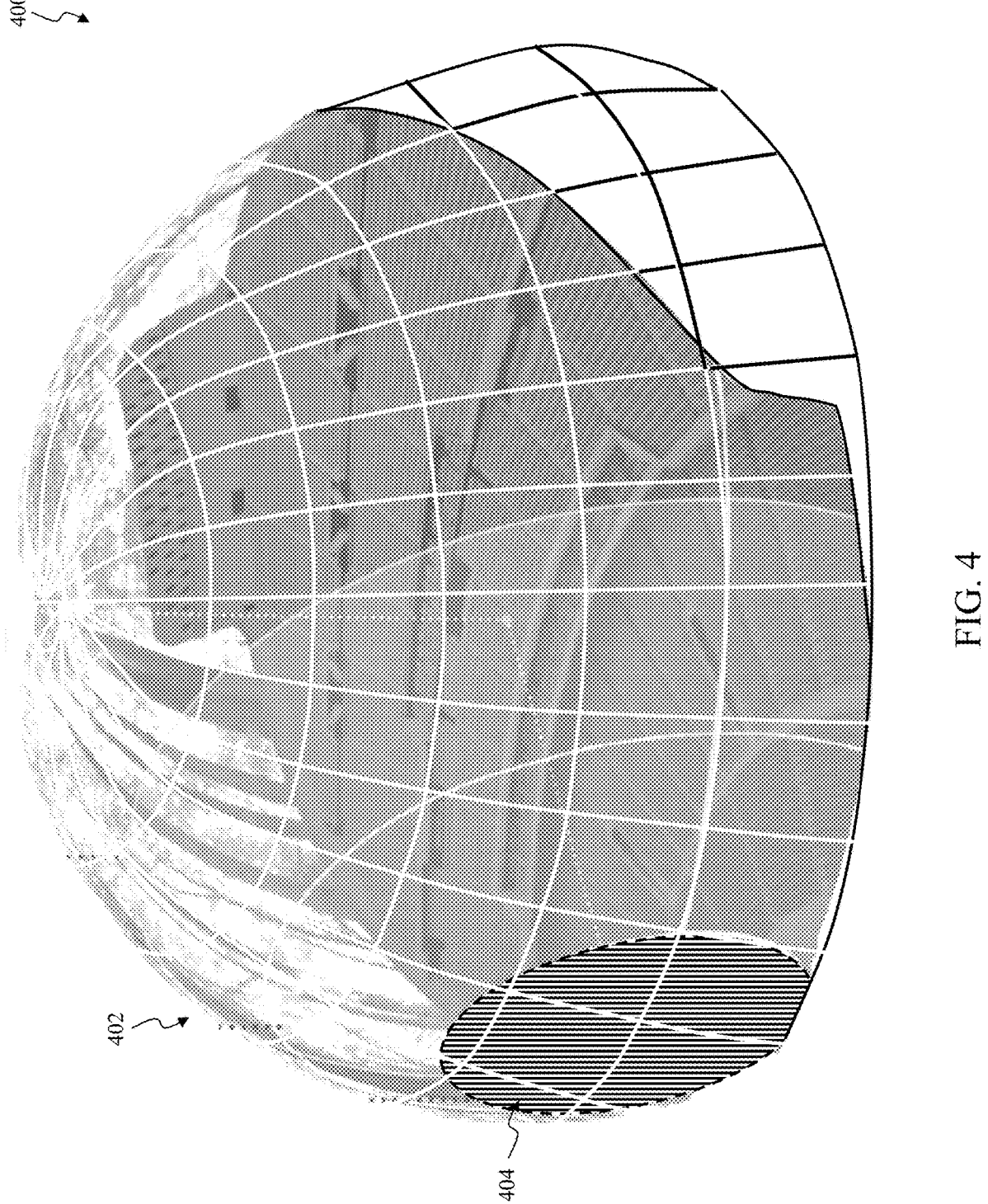
FIG. 4 illustrates a pictorial representation of an exemplary venue according to some exemplary embodiments of the present disclosure.

FIG. 4 illustrates a pictorial representation of an exemplary venue according to some exemplary embodiments of the present disclosure. As described above, an image recording system, such as the image recording system 108 as described above in FIG. 1 and/or the image recording system 300 as described above in FIG. 3 to provide some examples, can evaluate the digital image data and/or the image that can be reconstructed from the digital image data to intelligently decide the most important digital image data to be stored using the excess system resources. For example, the image can be projected onto a media plane 402 of a venue 400 during an event. The venue 400 can represent a music venue, for example, a music theater, a music club, and/or a concert hall, a sporting venue, for example, an arena, a convention center, and/or a stadium, and/or any other suitable venue that will be apparent to those skilled in the relevant art(s) without departing from the spirit and scope of the present disclosure. And the event can include a musical event, a theatrical event, a sporting event, a motion picture, and/or any other suitable event that will be apparent to those skilled in the relevant art(s) without departing from the spirit and scope of the present disclosure. In the exemplary embodiment illustrated in FIG. 4, the venue 400 can represent a three-dimensional structure, for example, a hemisphere structure, also referred to as a hemispherical dome. In some embodiments, the venue 400 can include one or more visual displays, often referred to as a three-dimensional media plane, that are spread across the interior, or intrados, of the venue 400. In these embodiments, the one or more visual displays can include a series of rows and a series of columns of picture elements, also referred to as pixels, which form a media plane 402. In these embodiments, the pixels can be implemented using one or more light-emitting diode (LED) displays, one or more organic light-emitting diode (OLED) displays, and/or one or more quantum dots (QDs) displays to provide some examples. For example, the media plane 402 can include an approximate 16,000 by 16,000 LED visual display that wraps around the interior of the venue 400 to form an approximate 160,000 square foot visual display.

In some embodiments, the venue 400 can project an image or a series of images, often referred to as video, which are reconstructed from the digital image data onto the media plane 402, for example, during the event. As illustrated in FIG. 4, the media plane 402 can include an audience viewing section 404 that is situated along the interior, or intrados, of the media plane 402. In some embodiments, the audience viewing section 404 can be characterized as having the highest optical image quality. In some embodiments, the audience viewing section 404 can be characterized as having more dense distributions of foreground objects as compared to other sections of the image or video having less dense distributions of foreground objects. In some embodiments, the audience viewing section 404 can be characterized as having more complexity, movement, and/or detail as compared to other sections of the image or video. In some embodiments, the audience viewing section 404 can be approximately situated at a haunch, which lies approximately halfway between the top and the base, of the media plane 402. The audience viewing section 404 can be characterized as having the highest optical image quality, for example, resolution, as compared to other viewing sections of the media plane 402. In some embodiments, the optical image quality of the image or the video lessens from the highest optical image quality of the audience viewing section 404 toward another viewing section that is diametrically opposite to the audience viewing section 404 along the interior of the media plane 402.

As described above, the image recording system can evaluate the digital image data to intelligently decide the most important digital image data to be stored as the second copy of at least some of the digital image data using the excess system resources. In some embodiments, the most important digital image data can be determined from the image or the video that can be projected onto the media plane 402. In these embodiments, the image recording system can decide that one or more sections of the image or the video, for example, the audience viewing section 404, that are projected onto one or more sections of the media plane within the field of view of the audience, for example, the audience viewing section 404, are the most important digital image data.

Figure 5:
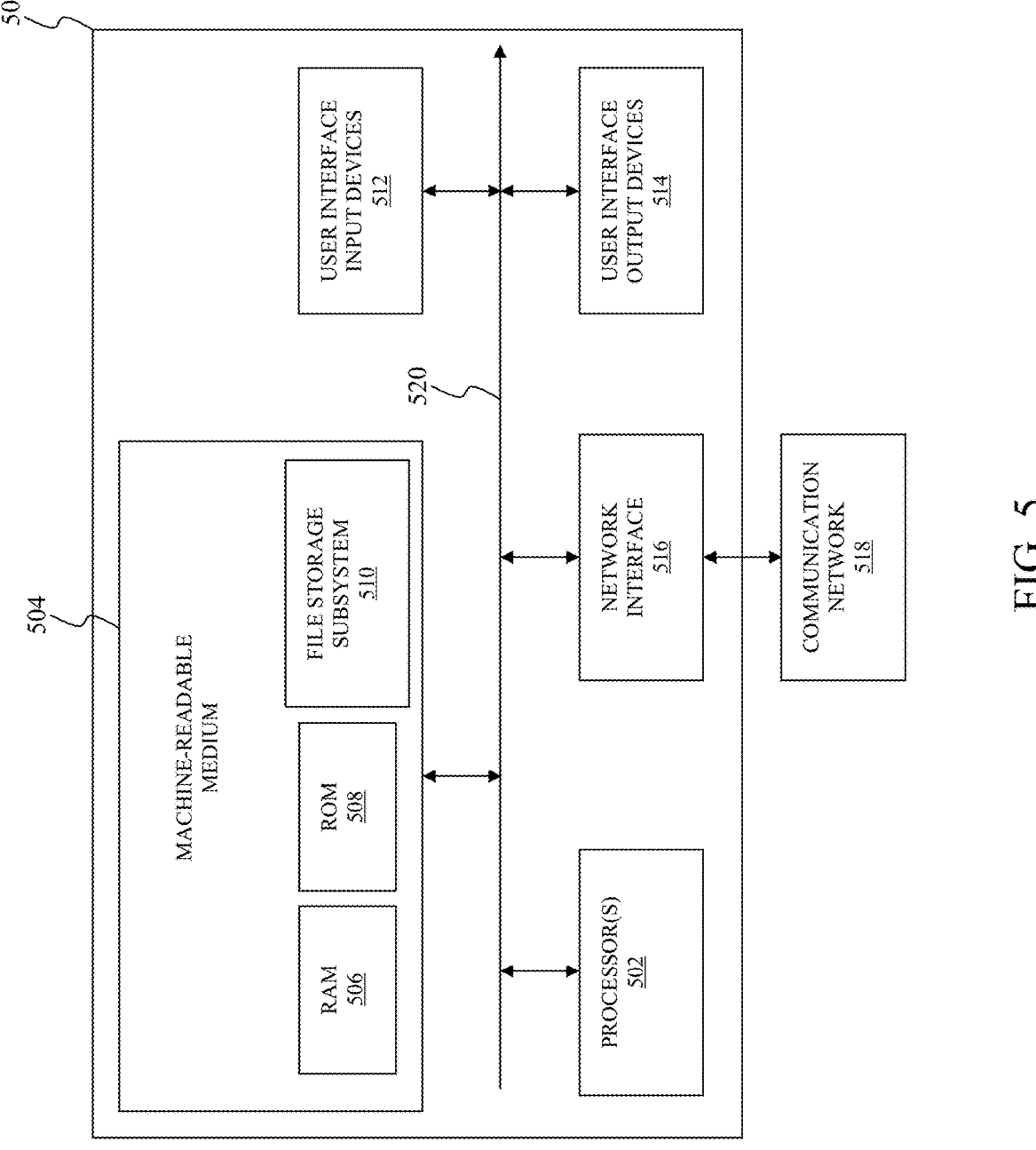
FIG. 5 illustrates a simplified block diagram of an exemplary computer system that can be implemented within the exemplary image capture system and/or the exemplary image projection system according to some exemplary embodiments of the present disclosure.

Exemplary Computer System that can be Implemented Within the Exemplary Image Capture System FIG. 5 illustrates a simplified block diagram of an exemplary computer system that can be implemented within the exemplary image capture system and/or the exemplary image projection system according to some exemplary embodiments of the present disclosure. The discussion of FIG. 5 to follow is to describe a computer system 500 that can be implemented within the image capture system 100 as described above in FIG. 1 and/or the image recording system 300 as described above in FIG. 3.

In the exemplary embodiment illustrated in FIG. 5, the computer system 500 includes one or more processors 502. In some embodiments, the one or more processors 502 can include, or can be, any of a microprocessor, graphics processing unit, or digital signal processor, and their electronic processing equivalents, such as an Application Specific Integrated Circuit ("ASIC") or Field Programmable Gate Array ("FPGA"). As used herein, the term "processor" signifies a tangible data and information processing device that physically transforms data and information, typically using a sequence transformation (also referred to as "operations"). Data and information can be physically represented by an electrical, magnetic, optical or acoustical signal that is capable of being stored, accessed, transferred, combined, compared, or otherwise manipulated by the processor. The term "processor" can signify a singular processor and multi-core systems or multi-processor arrays, including graphic processing units, digital signal processors, digital processors or combinations of these elements. The processor can be electronic, for example, comprising digital logic circuitry (for example, binary logic), or analog (for example, an operational amplifier). The processor may also operate to support performance of the relevant operations in a "cloud computing" environment or as a "software as a service" (SaaS). For example, at least some of the operations may be performed by a group of processors available at a distributed or remote system, these processors accessible via a communications network (e.g., the Internet) and via one or more software interfaces (e.g., an application program interface (API).) In some embodiments, the computer system 500 can include an operating system, such as Microsoft's Windows, Sun Microsystems's Solaris, Apple Computer's MacOs, Linux or UNIX. In some embodiments, the computer system 500 can also include a Basic Input/Output System (BIOS) and processor firmware. The operating system, BIOS and firmware are used by the one or more processors 502 to control subsystems and interfaces coupled to the one or more processors 502. In some embodiments, the one or more processors 502 can include the Pentium and Itanium from Intel, the Opteron and Athlon from Advanced Micro Devices, and the ARM processor from ARM Holdings.

As illustrated in FIG. 5, the computer system 500 can include a machine-readable medium 504. In some embodiments, the machine-readable medium 504 can further include a main random-access memory ("RAM") 506, a read only memory ("ROM") 508, and/or a file storage subsystem 510. The RAM 506 can store instructions and data during program execution and the ROM 508 can store fixed instructions. The file storage subsystem 510 provides persistent storage for program and data files, and may include a hard disk drive, a floppy disk drive along with associated removable media, a CD-ROM drive, an optical drive, a flash memory, or a removable media cartridge.

The computer system 500 can further include user interface input devices 512 and user interface output devices 514. The user interface input devices 512 can include an alphanumeric keyboard, a keypad, pointing devices such as a mouse, trackball, touchpad, stylus, or graphics tablet, a scanner, a touchscreen incorporated into the display, audio input devices such as voice recognition systems or microphones, eye-gaze recognition, brainwave pattern recognition, and other types of input devices to provide some examples. The user interface input devices 512 can be connected by wire or wirelessly to the computer system 500. Generally, the user interface input devices 512 are intended to include all possible types of devices and ways to input information into the computer system 500. The user interface input devices 512 typically allow a user to identify objects, icons, text and the like that appear on some types of user interface output devices, for example, a display subsystem. The user interface output devices 514 may include a display subsystem, a printer, a fax machine, or non-visual displays such as audio output devices. The display subsystem may include a cathode ray tube (CRT), a flat-panel device such as a liquid crystal display (LCD), a projection device, or some other device for creating a visible image such as a virtual reality system. The display subsystem may also provide non-visual display such as via audio output or tactile output (e.g., vibrations) devices. Generally, the user interface output devices 514 are intended to include all possible types of devices and ways to output information from the computer system 500.

The computer system 500 can further include a network interface 516 to provide an interface to outside networks, including an interface to a communication network 518, and is coupled via the communication network 518 to corresponding interface devices in other computer systems or machines. The communication network 518 may comprise many interconnected computer systems, machines and communication links. These communication links may be wired links, optical links, wireless links, or any other devices for communication of information. The communication network 518 can be any suitable computer network, for example a wide area network such as the Internet, and/or a local area network such as Ethernet. The communication network 518 can be wired and/or wireless, and the communication network can use encryption and decryption methods, such as is available with a virtual private network. The communication network uses one or more communications interfaces, which can receive data from, and transmit data to, other systems. Embodiments of communications interfaces typically include an Ethernet card, a modem (e.g., telephone, satellite, cable, or ISDN), (asynchronous) digital subscriber line (DSL) unit, Firewire interface, USB interface, and the like. One or more communications protocols can be used, such as HTTP, TCP/IP, RTP/RTSP, IPX and/or UDP.

As illustrated in FIG. 5, the one or more processors 502, the machine-readable medium 504, the user interface input devices 512, the user interface output devices 514, and/or the network interface 516 can be communicatively coupled to one another using a bus subsystem 520. Although the bus subsystem 520 is shown schematically as a single bus, alternative embodiments of the bus subsystem may use multiple busses. For example, RAM-based main memory can communicate directly with file storage systems using Direct Memory Access ("DMA") systems.

Conclusion

The Detailed Description referred to accompanying figures to illustrate exemplary embodiments consistent with the disclosure. References in the disclosure to "an exemplary embodiment" indicates that the exemplary embodiment described can include a particular feature, structure, or characteristic, but every exemplary embodiment may not necessarily include the particular feature, structure, or characteristic. Moreover, such phrases are not necessarily referring to the same exemplary embodiment. Further, any feature, structure, or characteristic described in connection with an exemplary embodiment can be included, independently or in any combination, with features, structures, or characteristics of other exemplary embodiments whether or not explicitly described.

The Detailed Description is not meant to be limiting. Rather, the scope of the disclosure is defined only in accordance with the following claims and their equivalents. It is to be appreciated that the Detailed Description section, and not the Abstract section, is intended to be used to interpret the claims. The Abstract section can set forth one or more, but not all exemplary embodiments, of the disclosure, and thus, are not intended to limit the disclosure and the following claims and their equivalents in any way.

The exemplary embodiments described within the disclosure have been provided for illustrative purposes and are not intended to be limiting. Other exemplary embodiments are possible, and modifications can be made to the exemplary embodiments while remaining within the spirit and scope of the disclosure. The disclosure has been described with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

Embodiments of the disclosure can be implemented in hardware, firmware, software application, or any combination thereof. Embodiments of the disclosure can also be implemented as instructions stored on a machine-readable medium, which can be read and executed by one or more processors. A machine-readable medium can include any mechanism for storing or transmitting information in a form readable by a machine (e.g., a computing circuitry). For example, a machine-readable medium can include non-transitory machine-readable mediums such as read only memory (ROM); random access memory (RAM); magnetic disk storage media; optical storage media; flash memory devices; and others. As another example, the machine-readable medium can include transitory machine-readable medium such as electrical, optical, acoustical, or other forms of propagated signals (e.g., carrier waves, infrared signals, digital signals, etc.). Further, firmware, software application, routines, instructions can be described herein as performing certain actions. However, it should be appreciated that such descriptions are merely for convenience and that such actions in fact result from computing devices, processors, controllers, or other devices executing the firmware, software application, routines, instructions, etc.

The Detailed Description of the exemplary embodiments fully revealed the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

What is claimed is:

1. An image capture system for capturing and storing digital image data of an image, the image capturing system comprising:
   a camera system configured to provide the digital image data in a raw format that includes color information for each pixel of the image; and
   an image recording system configured to:
      store a first copy of the digital image data in the raw format,
      estimate excess system resources that are not utilized to store the first copy of the digital image data, and
      store a second copy of at least some of the digital image data in the raw format or in an image file format when insufficient excess system resources are available to store the digital image data in its entirety.

2. The image capture system of claim 1, wherein the color information comprises luminance or chrominance color components of YUV color model or red, green or blue color components of a red, green, blue (RGB) color model.

3. The image capture system of claim 1, wherein the image recording system is configured to stripe the first copy of the digital image data or the second copy of the at least some of the digital image data across a plurality of machine-readable mediums of the image recording system.

4. The image capture system of claim 1, wherein the image recording system is further configured to reconstruct the image in the image file format from the digital image data.

5. The image capture system of claim 1, wherein the image recording system is further configured to:
   evaluate the image to decide most important digital image data from among the digital image data when insufficient excess system resources are available to store the digital image data in its entirety; and
   store the most important digital image data as the second copy of at least some of the digital image data.

6. The image capture system of claim 5, wherein the image recording system is configured to evaluate the image as projected onto a media plane of a venue to decide the most important digital image data as being digital image data from among the digital image data that is related to an audience viewing section of the media plane that is within a field of view of an audience within the venue.

7. The image capture system of claim 1, wherein the excess system resources comprise excess central processing unit (CPU) resources, excess memory resources, excess system bandwidth, or excess electrical power that are not utilized to store the first copy of the digital image data.

8. An image recording system for storing digital image data of an image, the image recording system comprising:
   a memory storage having a plurality of memory modules; and
   a controller configured to:
      store a first copy of the digital image data across the plurality of memory modules in a raw format that includes color information for each pixel of the image,
      estimate excess system resources that are not utilized to store the first copy of the digital image data, and
      store a second copy of at least some of the digital image data across the plurality of memory module in the raw format or in an image file format when insufficient excess system resources are available to store the digital image data in its entirety.

9. The image recording system of claim 8, wherein the color information comprises luminance or chrominance color components of YUV color model or red, green, or blue color components of a red, green, blue (RGB) color model.

10. The image recording system of claim 8, wherein the controller is configured to stripe the first copy of the digital image data or the second copy of the at least some of the digital image data across the plurality of memory modules.

11. The image recording system of claim 8, wherein the controller is further configured to reconstruct the image in the image file format from the digital image data.

12. The image recording system of claim 8, wherein the controller is further configured to:
   evaluate the image to decide most important digital image data from among the digital image data when insufficient excess system resources are available to store the digital image data in its entirety; and
   store the most important digital image data as the second copy of at least some of the digital image data.

13. The image capture system of claim 12, wherein the controller is configured to evaluate the image as projected onto a media plane of a venue to decide the most important digital image data as being digital image data from among the digital image data that is related to an audience viewing section of the media plane that is within a field of view of an audience within the venue.

14. The image recording system of claim 8, wherein the system resources comprise excess central processing unit (CPU) resources, excess memory resources, excess system bandwidth, or excess electrical power that are not utilized to store the first copy of the digital image data.

15. A method for storing digital image data of an image, the method comprising:
   storing, by a computing system, a first copy of the digital image data in a first image quality format;
   estimating, by the computing system, excess system resources that are not utilized to store the first copy of the digital image data; and
   storing, by the computing system, a second copy of at least some of the digital image data in the first image quality format or in a second image quality format that has lower image quality than the first image quality format when insufficient excess system resources are available to store the digital image data in its entirety.

16. The method of claim 15, wherein the storing the first copy of the digital image data comprises striping the first copy of the digital image data across a plurality of machine-readable mediums, and
   wherein the storing the second copy of the digital image data comprises striping the second copy of the at least some of the digital image data across the plurality of machine-readable mediums.

17. The method of claim 15, further comprising reconstructing, by the computing system, the image in the image file format from the digital image data.

18. The method of claim 15, further comprising:
   evaluating, by the computing system, the image to decide most important digital image data from among the digital image data when insufficient excess system resources are available to store the digital image data in its entirety; and
   storing, by the computing system, the most important digital image data as the second copy of at least some of the digital image data.

19. The image capture system of claim 18, wherein the evaluating comprises evaluating the image as projected onto a media plane of a venue to decide the most important digital image data as being digital image data from among the digital image data that is related to an audience viewing section of the media plane that is within a field of view of an audience within the venue.

20. The method of claim 15, wherein the excess system resources comprise excess central processing unit (CPU) resources, excess memory resources, excess system bandwidth, or excess electrical power that are not utilized to store the first copy of the digital image data.

* * * * *